(12) United States Patent
Stevens

(10) Patent No.: US 6,197,232 B1
(45) Date of Patent: Mar. 6, 2001

(54) METHOD FOR PRODUCING COMPOSITE GOLF CLUB SHAFTS

(76) Inventor: Robert Stevens, 11401 Central Ave., Chino, CA (US) 91710

( * ) Notice: Subject to any disclaimer, the term of this patent is extended or adjusted under 35 U.S.C. 154(b) by 0 days.

(21) Appl. No.: 09/404,212

(22) Filed: Sep. 23, 1999

Related U.S. Application Data

(60) Provisional application No. 60/104,854, filed on Oct. 19, 1998.

(51) Int. Cl.[7] .............................. B29C 44/06; B29C 44/12
(52) U.S. Cl. ....................... 264/45.3; 264/46.5; 264/46.9; 264/54; 264/258
(58) Field of Search .................................. 264/45.3, 26.5, 264/26.9, 54, 258

(56) References Cited

U.S. PATENT DOCUMENTS

| | | | |
|---|---|---|---|
| 4,124,670 | * 11/1978 | Cecka et al. ......................... | 264/45.3 |
| 5,244,211 | *  9/1993 | Lukasiewicz ......................... | 264/45.4 |
| 5,474,721 | * 12/1995 | Stevens .................................. | 264/54 |
| 5,837,181 | * 11/1998 | Leimbacher et al. ................ | 264/258 |
| 5,943,758 | *  8/1999 | Haas ..................................... | 156/172 |
| 6,071,460 | *  6/2000 | Renaudin et al. ................... | 264/257 |

* cited by examiner

Primary Examiner—Allan R. Kuhns

(57) ABSTRACT

A lightweight shaft configured for use as a golf club shaft or a composite golf club equipped with such a shaft. The uniqueness of this shaft is that it is made of two distinct composite walls (tubes, one tube within another) with a greater density than, and separated by, an expansive middle layer of lesser density material which expands with the application of heat during the composite curing cycle. Additionally, the tip of the shaft (one to six inches in length from the tip, or longer, as required by design) is to be made of solid material (composite, metal or other material). The addition of this solid tip to the shaft as called for in this invention, provides for a stronger and solid tip that can be adjusted to fit into the hosel openings of any club head. This goes to provide a much stronger joining of the head to the shaft and adds to the clubs impact with the golf ball thus providing for greater travel distance of the ball.

4 Claims, 1 Drawing Sheet

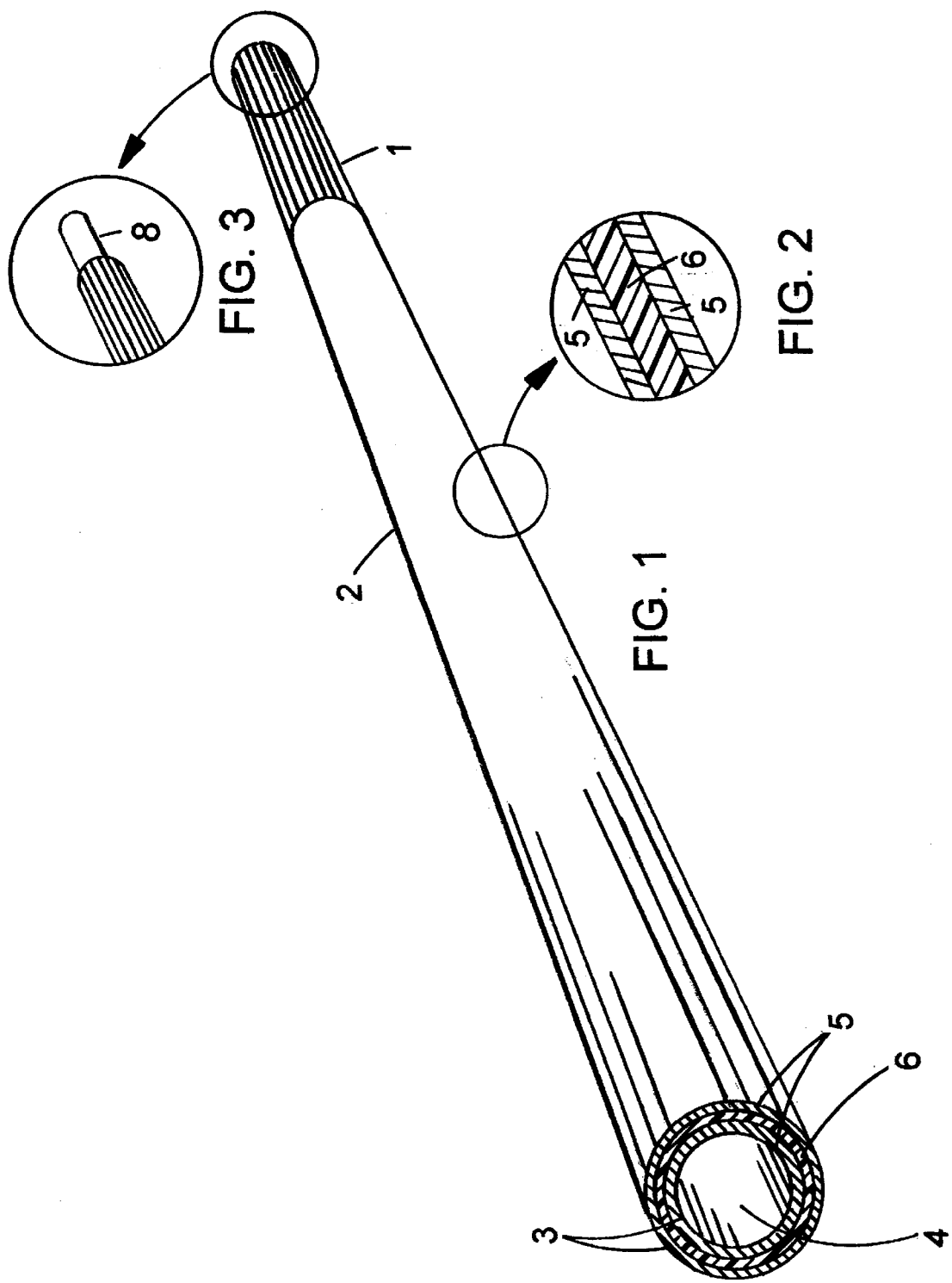

METHOD FOR PRODUCING COMPOSITE GOLF CLUB SHAFTS

This application claims the benefit of U.S. Provisional Application No. 60/104,854, filed Oct. 19, 1998.

BACKGROUND OF THE INVENTION

1. Field of the Invention

The present invention is related to the field of golf clubs, and in particular, to the shafts used in a golf club. U.S. Pat. No. 5,474,721, the entire disclosure of which, is herein incorporated by reference describes a process for curing composite shapes.

2. Description of Background and Relevant Information

There are three major elements in a golf club, namely a grip, a shaft and a head (butt). The shaft can be manufactured in wood, metal, plastic or composite materials. In order to achieve an acceptable weight, the shaft is generally made of tubes of metal or composite materials. The composite shafts are generally lighter, stronger and allow for improved club-head speed and greater impact to the ball. The use of the "double-wall" composite shaft allows for the more precise distribution of material for refining the degree of "flex" in the shaft, as provided for in the instant application. This is achieved by designing either of the two walls, which are separated by the less dense matrix material, to a desirable stiffness. The middle matrix material reduces any vibrations when the club comes in contact with a golf ball. This results in a superior deadening "feel" which is very comfortable in the golfer's hands. The juxtaposition of the two composite tubes act together to control the degree of flex of the shaft and allows for the two tubes to act together and in opposition to one another. This provides for a more resilient shaft giving more dynamic impact to the ball, which produces longer drives. Without the addition of extra weight, this invention provides a structurally sound shaft and an increased resistance to fractures.

SUMMARY OF THE INVENTION

An object of this invention is to create a new golf shaft combining lightness, strength, controllable flex characteristics and added response when hitting a golf ball, while reducing unwanted vibrations.

A golf club is formed by the design and fabrication of a unique hard or soft mold to produce a shaft consisting of two tubes (composite, metal or other material). One tube is inside the other and fabricated in one procedure in a unique mold that allows for the production of a "double-walled" tube in a single operation. The golf shaft will have a solid tip one to six inches in length, starting from the tip to the butt-end of the shaft, which can be made to accommodate the different hosel openings in the golf club head. The solid tip of the shaft described in this application is an improvement to the process for forming the "double-walled" shaft as depicted and described in the above issued patent, issued to this inventor (U.S. Pat. No. 5,474,721).

Utilizing the process described in the above-mentioned patent, the two tubes are consistent in dimensions and are designed to accommodate each of the two tubes. Each of the two tubes has a density greater than that of the middle matrix material, which expands upon the application of heat during the curing cycle of the composite tubes. The middle matrix material provides the needed pressure for the curing of the composite tubes. The entire golf club is fabricated in a single operation by unifying all the components of the "double-wall" composite shaft. The thickness of the tubes can be modified to affect the flex of the shaft, thereby affecting and customizing the "feel" of the golf-shaft and mitigating excessive vibrations upon hitting a golf ball.

BRIEF DESCRIPTION OF THE DRAWINGS

FIG. 1 shows a perspective view of the shaft, with the hand grip end closest to the viewer.

FIG. 2 shows an expanded cross section of the golf shaft.

FIG. 3 shows an alternative end to the end of the shaft that fits into the hosel of a golf club head.

DETAILED DESCRIPTION OF INVENTION

An integral part of this invention is the chemical matrix material which is used to control its expansion to a given point, after the imposition of heat. The chemical matrix material continues to expand between the layer of higher density composite material, thereby providing the pressure needed to produce a competent composite part. The chemistry involved in the construction of the expandable matrix material can be made from one or more of the following classes of materials.

Epoxy Resins:
 Polyglycidyl Ethers, Cresol or Phenol Formaldehyde Novolacs, Diglycidyl Ethers of Bis-phenol A, Cycloaliphatic Epoxides, Glycidyl Esters, Thioglycidyl resins.

Epoxy Hardeners:
 Aliphatic Primary Amines, Aromatic Primary Amines, Tertiary and Secondary Amines, Polyfunctional Amides, Acid Anhydrides, Acis curing agents-i.e., Lewus Acids.

Fillers:
 Carbon Fibers, Glass Fibers, Al or Mg Silicates, Ca or Mg Carbonates.

Expanding Agents:
 Water, p.-p. oxybisbenezenesulfonylhydrazide, dinitrosopentamethyleneteramine, amine boranes, and borohydrides, trimethoxyboroxine.

The present invention is directed to correct for all of the problems inherent in a conventional fabrication of composite materials.

The present invention need not consider any extraneous considerations, such as coefficients of expansion, external pressures from autoclaves, vacuum bagging or any other mechanical pressure devices. By utilizing the pressure created by the expandable matrix material (6) trapped between the thermoset composite materials (5) inside a closed mold, sufficient internal pressure is created to properly compress the composite material and create a totally cured part consisting of the thermoset composite material and the matrix material.

By this simple process, thermoset composite structures of many complex shapes and sizes may be fabricated and said shapes and sizes are limited only by the definitions and configurations that can be imparted to a mold in which the composite structures are cured. These structures may include "thin-walled skins" and "double-walled tubes" such as golf-shafts for golf-clubs, as well as any such convoluted shapes as the design may require. The "Double-Walled Composite Structures is a particularly unique structure produced only by the use of this invention and to which many useful applications in industry are amenable.

As can readily be seen in FIG. 1, the double-walled composite structure (2) is formed by molding an expandable lower density matrix material (6) between 2 higher density composite material (5), forming a sandwich structure, which is supported by a metal mandrel or core (4). An end of the shaft (1) is made of solid composite in order to provide strength to the club when it is installed in the hosel of a golf club head. Molding the golf club shaft using this method yields a smooth outer and inner surface (3).

With reference to FIG. 2, an expanded cross section is shown, of the wall of the shaft with the higher density inner, and higher density outer (5) composite material surrounding the expandable matrix material (6).

With reference to FIG. 3, an alternative embodiment of the end of the shaft is shown, where the end (1) has a lesser diameter (8), this being the diameter of the hosel of the golf club heads.

Not only does the process indicated by this invention allow for fabrication in thermoset composites with great savings of time, labor and money, but it also allows for the design and fabrication of composite structures heretofore impossible to manufacture by conventional processes. All that is required in the process is for the composite material to be laid up in and against the periphery of the mold interior and then to administer the expandable matrix material on both halves of the mold to the rim. Then, after closing the mold tightly, the expandable matrix material is injected, through a nozzle penetrating the mold, into the mold between the composite materials until the mold is filled. The nozzle is then shut off, so that none of the expandable material can escape and the mold is then subjected to the required heat (between 250 degrees F and 500 degrees F (some higher temperature composites can be used similarly) and heated to a curing point.

An alternative method for positioning the expandable matrix material is during the lay-up of the composite, then closing the mold and lightly compressing the components of the mold to hold them together. The mold is then heated to a cure temperature, which causes the expandable matrix material to expand during the normal cure cycle.

What is claimed is:

1. A method for producing composite golf club shafts comprising:

(a) providing a mold, the mold having a cavity, the cavity having a shape complementary to a golf club shaft shape to be produced, the cavity additionally having a periphery;

(b) laying up a first layer of pre-impregnated thermoset composite material into the periphery of the mold cavity;

(c) laying up a second layer of pre-impregnated thermoset composite material onto the first layer of pre-impregnated thermoset composite material located in the periphery of the mold cavity;

(d) filling the mold cavity between the first layer of pre-impregnated thermoset composite material and the second layer of pre-impregnated thermoset composite material, either prior to the closing of the mold, or after the closing of the mold, by injecting an expandable matrix material therein, which, expands by action of an expanding agent when heat is applied, filling the mold cavity, compressing the first layer of pre-impregnated thermoset composite material and the second layer of pre-impregnated thermoset composite material forming a totally cured part comprising the first layer of pre-impregnated thermoset composite material and the second layer of pre-impregnated thermoset composite material and the expandable matrix material wherein the expandable matrix material is selected from the group consisting of polyglycidyl ethers, cresol, phenol formaldehyde novolacs, diglycidyl ethers of bisphenol A, cycloaliphatic epoxides, glycidyl esters and thioglycidyl resins and wherein said expanding agent is trimethoxyboroxine, (e) introducing heat into the mold cavity in an amount sufficient to activate a resin in the composite material and a resin in the expandable matrix material, thereby permitting the expandable matrix material to expand and form a totally unified and cured part with the first layer of pre-impregnated thermoset composite material and the second layer of pre-impregnated thermoset composite material, such that during a cure cycle sufficient compression is delivered to the composite material to form the desired shape of the golf club shaft;

(f) cooling the mold; and (g) removing the part from the mold and removing any flash from the part.

2. The method of claim 1 wherein the golf club shaft is a double-walled tube, each wall of the double-walled tube comprises at least one layer of pre-impregnated thermoset composite material, and at least one layer of expandable matrix material sandwiched therebetween.

3. The method of claim 1 wherein the thermoset composite material comprises graphite, fiberglass or aramid fibers.

4. The method of claim 1 wherein the expandable epoxy matrix material contains reinforcing fibers.

* * * * *